United States Patent
Kosaka et al.

(10) Patent No.: US 12,435,249 B2
(45) Date of Patent: Oct. 7, 2025

(54) METHOD FOR SEPARATING JOINED OBJECT

(71) Applicant: NITTO DENKO CORPORATION, Ibaraki (JP)

(72) Inventors: Naofumi Kosaka, Ibaraki (JP); Yosuke Shimizu, Ibaraki (JP); Kenta Kumakura, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 114 days.

(21) Appl. No.: 18/040,474

(22) PCT Filed: Jul. 13, 2021

(86) PCT No.: PCT/JP2021/026290
§ 371 (c)(1),
(2) Date: Feb. 3, 2023

(87) PCT Pub. No.: WO2022/030198
PCT Pub. Date: Feb. 10, 2022

(65) Prior Publication Data
US 2023/0312990 A1    Oct. 5, 2023

(30) Foreign Application Priority Data
Aug. 5, 2020 (JP) ................................ 2020-133217

(51) Int. Cl.
*C09J 7/38* (2018.01)
*B32B 43/00* (2006.01)

(52) U.S. Cl.
CPC ............... *C09J 7/38* (2018.01); *B32B 43/006* (2013.01); *C09J 2203/318* (2013.01); *C09J 2301/302* (2020.08); *C09J 2301/312* (2020.08); *C09J 2301/416* (2020.08); *C09J 2301/502* (2020.08); *C09J 2400/143* (2013.01)

(58) Field of Classification Search
CPC ............... C09J 201/00; C09J 2203/318; C09J 2301/302; C09J 2301/312; C09J 2301/416; C09J 2301/502; C09J 2400/143; C09J 5/06; C09J 7/38; B32B 43/006
See application file for complete search history.

(56) References Cited

U.S. PATENT DOCUMENTS

| | | | |
|---|---|---|---|
| 2009/0139433 A1* | 6/2009 | Moszner | A61K 6/887 106/35 |
| 2010/0304134 A1 | 12/2010 | Nakano et al. | |
| 2011/0008552 A1* | 1/2011 | Umemoto | C09J 133/02 428/350 |
| 2013/0071656 A1 | 3/2013 | Yamagata et al. | |
| 2015/0107762 A1* | 4/2015 | Nair | B32B 43/006 156/247 |
| 2015/0225625 A1 | 8/2015 | Niimi et al. | |
| 2017/0229000 A1* | 8/2017 | Law | G01K 3/04 |
| 2021/0214587 A1 | 7/2021 | Kosaka et al. | |

FOREIGN PATENT DOCUMENTS

| | | | | |
|---|---|---|---|---|
| CN | 101896841 A | 11/2010 | | |
| CN | 101952385 A | 1/2011 | | |
| CN | 103013398 A | 4/2013 | | |
| CN | 104619798 A | 5/2015 | | |
| CN | 106104658 A | 11/2016 | | |
| EP | 2241911 A1 * | 10/2010 | | C09J 133/08 |
| JP | 2004-83177 A | 3/2004 | | |
| JP | 2005-247980 A | 9/2005 | | |
| JP | 2009-199069 A | 9/2009 | | |
| JP | 2009-242792 A | 10/2009 | | |
| JP | 2011-84733 A | 4/2011 | | |
| JP | 2014-008450 A | 1/2014 | | |
| JP | 2017-77947 A | 4/2017 | | |
| JP | 2017-176989 A | 10/2017 | | |
| JP | 2019-135180 A | 8/2019 | | |
| JP | 2020-23656 A | 2/2020 | | |
| TW | 200938907 A | 9/2009 | | |
| TW | 201011082 A1 | 3/2010 | | |
| WO | 2019/151194 A1 | 8/2019 | | |

OTHER PUBLICATIONS

International Search Report for PCT/JP2021/026290 dated, Oct. 19, 2021 (PCT/ISA/210).
Office Action issued Oct. 23, 2024 in Taiwanese Application No. 110128897.
Notice of Reasons for Refusal issued Feb. 6, 2025 in Japanese Application No. 2022-541181.
First Office Action issued May 23, 2025 in Chinese Patent Application No. 202180056843.1.

* cited by examiner

*Primary Examiner* — Philip C Tucker
*Assistant Examiner* — Jimmy R Smith, Jr.
(74) *Attorney, Agent, or Firm* — Sughrue Mion, PLLC

(57) ABSTRACT

To provide a separation method for a joined object for display device, by which PSA can be peeled off even when the PSA is tightly bonded to a member in the joined object. Provided is a method for separating a joined object for display device. In this method, the joined object comprises two members joined with a PSA comprising a hydrophilicity enhancer. The method comprises a step of peeling the PSA from the member by supplying steam towards the PSA.

12 Claims, 1 Drawing Sheet

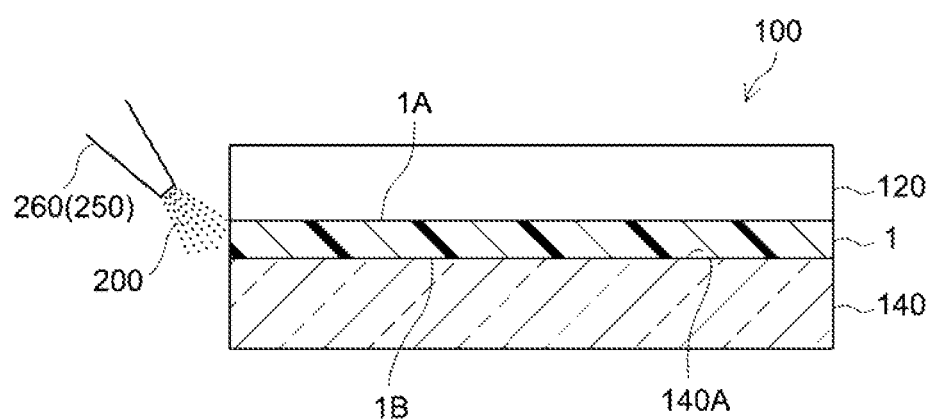

METHOD FOR SEPARATING JOINED OBJECT

TECHNICAL FIELD

The present invention relates to a method for separating a joined object. This application is a National Stage of International Application No. PCT/JP2021/026290 filed Jul. 13, 2021, claiming priority to Japanese Patent Application No. 2020-133217 filed on Aug. 5, 2020; and the entire content thereof is herein incorporated by reference.

BACKGROUND ART

In general, pressure-sensitive adhesive (PSA) exists as a soft solid (a viscoelastic material) in a room temperature range and has a property to adhere easily to an adherend with some pressure applied. For such a property, PSA has been widely used in various fields as an on-support PSA sheet having a PSA layer on a support or as a support-less PSA sheet free of a support. When necessary, the used PSA is peeled off the adherends by suitable means. Technical documents about PSA sheets include Patent Document 1. Technical documents for peeling PSA from adherends include Patent Documents 2 to 5.

CITATION LIST

Patent Literature

[Patent Document 1] Japanese Patent Application Publication No. 2020-23656
[Patent Document 2] Japanese Patent Application Publication No. 2004-83177
[Patent Document 3] Japanese Patent Application Publication No. 2017-77947
[Patent Document 4] Japanese Patent Application Publication No. 2017-176989
[Patent Document 5] Japanese Patent Application Publication No. 2019-135180

SUMMARY OF INVENTION

Technical Problem

Lately, from the standpoint of reducing environmental stress and saving resources, etc., members joined with PSA are often separated from post-use products for reutilization (recycling, reuse, etc.). Especially, display devices installed in products having display functions such as smartphones, PCs (desktops, notebooks, tablets, etc.) and televisions have multilayer structures including several different kinds of functional members, such as liquid crystal display devices, organic EL (electroluminescence) display devices and PDP (plasma display panels), differing in materials from member to member. Thus, there are great advantages to reutilization through recycling, reuse, etc.

A PSA bonded to an adherend such as a member is typically peeled off the adherend by using its own removability. However, PSAs used for fixing members of display devices are often required to have high levels of bonding reliability and generally have high adhesive strength to adherends. Thus, overall, they tend to have lower peelability (removability). In addition, because display devices typically include thin members and hard brittle members such as glass, they are susceptible to defects such as breaking and tearing of members during PSA removal. Under such circumstances, as an art combining bonding strength and removability from adherends, in Patent Document 1, the present inventors suggest a PSA sheet (water-peelable PSA sheet) that can be easily peeled off using an aqueous liquid such as water and has improved waterproof reliability during joining.

Even with a PSA having such superior removability, however, when used over a prolonged period, due to the usage environment history, etc., the adhesive strength can increase, making the intended removal difficult. Such a PSA is tightly bonded to the adherend; and even with hot water immersion, sonication, etc., its removal can be time-consuming or even impossible, obstructing reutilization. With respect to such a case where a PSA is used to sort of join members over a prolonged period and the PSA is tightly bonded to the members, there is a demand for a method by which the PSA can be peeled off the adherends and the members joined with the PSA can be separated.

The present invention has been made in view of the above circumstances with an objective to provide a method for separating a joined object for display device, the method allowing PSA removal even when the PSA is tightly bonded to a member.

Solution to Problem

This description provides a method for separating a joined object for display device. In this method, the joined object comprises two members joined with a PSA comprising a hydrophilicity enhancer. The method further comprises a step of peeling the PSA from the member by supplying steam towards the PSA. According to the method, even when the PSA is tightly bonded to the members in the joined object, the PSA can be peeled off the member to separate the joined object. For instance, when, due to prolonged joining time or the like, a hydrophilicity enhancer-containing water-peelable PSA cannot be peeled off a member by water-peeling using an aqueous liquid (i.e., when the water-peeling properties are lost), the method can be applied to peel the PSA off. In addition, as compared with hot water immersion and sonication, steam peeling (peeling with a supply of steam) brings about quick peeling, leading to excellent removal efficiency.

It is noted that Patent Documents 2 to 5 mention steam peeling. In particular, Patent Document 2 discusses removal of PSA sheets that have been bonded to aluminum, iron and acrylic plates for five years by spraying high-temperature high-pressure water vapor. Patent Documents 3 to 4 describe that heat removable PSA labels comprising heat expandable fillers are peeled off adherends by spraying high-temperature water vapor. Patent Document 5 also regards to the use of vapor along with a peeling facilitator for removal of a PSA bonded to an adherend. As for applicable objects, however, these conventional art documents do not mention display device components bonded with hydrophilicity enhancer-containing water-peelable PSA, the components possibly including those that are easily breakable during removal for being thin or hard and brittle. These documents do not suggest to remove a PSA tightly bonded to members for use in a display device without damage to the members.

In some embodiments, at least one of the two members is a glass member. Even when the adherends include a hard brittle glass member, the method disclosed herein (in particular, the PSA peeling method, i.e., the steam peeling of a hydrophilicity enhancer-containing PSA) can separate the members without damaging (typically breaking) the glass member.

In some embodiments, one of the two members is a glass member and the other is a display member having a thickness of 2 mm or less. Even when the joined members include a hard brittle glass member and a thin display member of 2 mm or less in thickness, the method disclosed herein can separate the members without damaging (typically breaking or tearing) the glass member or the display member.

In some preferable embodiments, the hydrophilicity enhancer content of the PSA is 0.05 part by weight to 3.00 parts by weight to 100 parts by weight of a polymer contained in the PSA. The method disclosed herein is effective for removal of a PSA comprising a limited amount of hydrophilicity enhancer allowed for use in display devices.

In some embodiments, the PSA is a PSA layer having a thickness of 100 μm or greater. A thick PSA layer has high adhesive strength which is likely to increase with time, often leading to difficulties in removal. With respect to such a PSA layer, it is effective to apply the method disclosed herein.

In some embodiments, the PSA layer has a haze value of 10% or lower. The PSA layer having a low haze value is less harmful to the adherend's optical properties and is favorable for use in display devices. The low-haze PSA layer is not particularly limited. Besides using a highly transparent material, it can be obtained by quantitatively limiting the use of additives or by selecting certain additive species.

The steam is typically supplied by spraying. The steam has a temperature of preferably 70° C. or higher and below 100° C. at a distance of 1 cm from the orifice of the steam discharge nozzle. By spraying steam in the temperature range, while preventing or reducing thermal alteration and the like of the adherend members, the PSA can be peeled off at the member in short time.

The method according to some preferable embodiments include, before supplying the steam towards the PSA, a step of judging if the PSA is water-peelable from at least one of the two members. Here, the water-peeling is carried out while an aqueous liquid is present where the PSA is being peeled off (separated from) the member surface. After an absence of possibility for water-peeling is confirmed, the steam is supplied towards the PSA. The method disclosed herein is particularly suitable for removal of a now non-water-peelable PSA that could originally be removed from adherends by water-peeling, but now has impaired water-peeling properties.

In some embodiments, the display device is a liquid crystal display device or an organic EL display device. The method disclosed herein is suitable for separating members constituting a liquid crystal display device or an organic EL display device whose recycling is highly beneficial.

BRIEF DESCRIPTION OF DRAWINGS

FIG. 1 shows a schematic cross-sectional diagram for illustrating the joined object separation method according to an embodiment.

DESCRIPTION OF EMBODIMENTS

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

<Separation Method for Joined Object>

The art disclosed herein related to a method for separating two PSA-joined members from a joined object comprising the members. Hereinafter, the method disclosed herein is described with respect to some embodiments in reference to FIG. 1, but is not to be limited to these embodiments.

(Joined Object)

The joined object for display device to be separated by the art disclosed herein is used in a display device, encompassing members constituting the display device and a structure comprising members joined to the display device. For instance, joined object 100 according to the embodiment shown in FIG. 1 has a structure in which a display member as a first member 120 and a glass member as a second member 140 are joined together with a PSA 1. Besides the inclusion of at least two members subject to separation, joined object 100 is not particularly limited and may include two or more members. For instance, it can be a multilayer structure in which two or more layer-like objects are laminated. The two members may be continuous outside a part where they are joined with the PSA.

In this embodiment, the display member as the first member 120 serves a display function in the display device. In an embodiment of joined object 100 as a multilayer structure as shown in FIG. 1, the first member 120 may have a sheet form or a plate form. In this embodiment, the first member (display member) 120 has a thickness of 2 mm or less. It is noted that the first member 120 is not necessarily a display member. Joined object 100 can be in various forms including an embodiment where the first and second members 120 and 140 are both transparent members (e.g., at least one being a glass member).

The glass member as the second member 140 comprises a glass material and is a plate member (typically a glass plate) in this embodiment. In an embodiment of joined object 100 as a multilayer structure as shown in FIG. 1, the second member 140 may have a sheet form or a plate form. The glass member is typically formed of a glass material, but is not limited to this. It may be formed with at least the PSA side surface 140A (the surface bonded to PSA 1) including a layer formed of glass. It is noted that the glass member is typically a transparent member having optical transparency in joined object 100 for display device. The second member 140 is not limited to a glass member. It can be an optical non-glass (e.g., resin) member or a transparent member formed of a non-glass material (e.g., a transparent resin member).

PSA 1 comprises a hydrophilicity enhancer. In this embodiment, PSA 1 is in sheet form (PSA sheet), in particular, in the form of an adhesively double-faced PSA sheet without substrate. PSA 1 can be referred to as a layer (i.e., a PSA layer). In PSA 1, one surface (first adhesive face) 1A is bonded to the first member 120 and the other surface (second adhesive face) 1B is bonded to the second member 140. Like this, the first and second members 120 and 140 are joined with a sort of sheet or layer of PSA 1. In this embodiment, PSA 1 has a thickness of 100 μm or greater. PSA 1 in this embodiment is an optical PSA for use in display devices and has a haze value of 10% or lower.

PSA 1 comprising a hydrophilicity enhancer as described above was water-peelable and could originally be removed by water-peeling Nevertheless, because of its use history, it is now non-water-peelable with impaired water-peeling properties. Thus, as PSA 1 is tightly bonded to the first and second members 120 and 140, it is now difficult to remove PSA 1 from these members, not only by normal peeling, but also by water-peeling. Moreover, it is now bonded to these members so tightly that it is difficult to remove even by means of hot water immersion, sonication, etc. Such an event may happen, for instance, when PSA 1 is used to join members for a prolonged period and experiences an excessive increase in adhesive strength.

It is noted that the water-peeling and water-peeling properties as used herein refer to removal (water-peeling) using an aqueous liquid such as water and the ease of so doing (water-peeling properties). Water-peeling refers to, for instance, removal of PSA from adherend in the presence of aqueous liquid at the peel front line (i.e., where peeling (separation) starts at their bonding interface) between the adherend surface and the adhesive face of the PSA (possibly in PSA layer or PSA sheet form).

(Steam Peeling)

As described above, for PSA 1 whose removal is difficult by normal peeling and water-peeling, removal is carried out by supplying steam 200 as shown in FIG. 1. In particular, steam 200 is supplied towards PSA 1 joining the first and second members 120 and 140 to peel (steam-peel) PSA 1 from at least one of the two members. To supply steam 200, it is preferable to spray steam 200. Using a commercial steam sprayer 250, steam 200 is sprayed towards PSA 1 from a nozzle (steam discharge nozzle) 260 of the steam sprayer. In particular, at the front line of peeling PSA 1 from member(s) (the first member 120 and/or the second member 140)—where peeling (separation) starts at their bonding interface, while spraying steam 200 at the interface between the member(s) and PSA 1, removal is allowed to proceed by moving the peel front line. By this, PSA 1 can be removed in short time from at least one of the two members 120 and 140. Steam sprayer 250 can have a known or conventional constitution and is not particularly limited to a specific structure or the like.

Steam-peeling can be carried out by applying steam 200 directly towards PSA 1 joining the first and second members 120 and 140. However, for efficiency, steam 200 is applied to a peeling start point formed with a cutter or spatula at an edge of the bonding interface between PSA 1 and the member 120 or 140. In preferable steam-peeling, among the first member 120 and/or the second member 140 and PSA 1, at least one is held by hand protected with glove or by using a suitable tool; and steam 200 is applied to the peel front line while applying suitable force in the direction in which peeling proceeds.

In particular, steam 200 can be sprayed at the peel front line of the first member 120 and PSA 1 in their interface, or to the peel front line of the second member 140 and PSA 1 in their interface. Like this embodiment, in an embodiment in which the first member 120 is a display member and the second member 140 is a glass member, it is preferable to spray steam 200 at or near the interface between PSA 1 and the glass member as the second member 140. By supplying steam 200 at the interface between the glass surface and hydrophilicity enhancer-containing PSA 1, PSA 1 can be removed more smoothly.

In order to generate a sufficient amount of vapor, the temperature of steam 200 is suitably near/at or above 100° C. at the point of discharge. However, it is sufficient that enough heat and moisture (water vapor, etc.) be supplied towards the peel front line between PSA 1 and the adherend. For instance, it may also be at or above about 80° C. From the standpoint of ensuring safety of workers and preventing thermal alteration of adherend, it is desirable that the temperature of steam 200 is not excessively high. At a distance of 1 cm outward from the orifice of the nozzle discharging steam 200, it is desirable that steam 200 has a temperature below 100° C. (e.g., 70° C. or higher and below 100° C., favorably 70° C. or higher and 90° C. or lower).

The discharge pressure of steam 200 is not particularly limited. From the standpoint of enhancing the steam-peeling properties, it is satisfactorily normal pressure (1 atm in particular) or higher, or preferably 1.5 atm or higher (e.g., 2 atm or higher). From the standpoint of the workability, it is suitably about 5 atm or lower (e.g., 4 atm or lower). In the above temperature ranges and discharge pressure ranges, steam 200 comprises water vapor and may further include droplets (typically microdroplets) of water formed by condensation of at least some of the water vapor. The amount of steam 200 to be discharged is not particularly limited and can be in a suitable range based on the specifications of steam sprayer 250, discharge pressure of steam 200, speed of peeling PSA 1, etc.

Even with joined object 100 in which PSA 1 is tightly bonded as described above and peeling is difficult by normal peeling and water-peeling, by carrying out the steam-peeling, PSA 1 can be peeled off at least one of the first and second members 120 and 140; and joined object 100 can be separated (disassembled). Joined objects for display device often include thin members and hard brittle members such as glass. However, according to the method described above, PSA can be removed from the member without damaging the adherends and the removal can be completed in short time.

(Judging Possibility for Water-Peeling)

While no particular limitations are imposed, with respect to a PSA difficult to be removed by water-peeling as described above (i.e., a now non-water-peelable PSA), the steam peeling described above is effective and favorable in removing the PSA from a member. Accordingly, as for the joined object separation method according to preferable embodiments, it may be possible to employ a method that comprises, before supplying steam at the PSA, a step of judging if the PSA can be water-peeled from two members (the aforementioned first and second members) joined with the PSA (a water-peeling possibility judging step); and that supplies the steam towards the PSA as described above after absence of possibility for water-peeling is confirmed. It is typically difficult to externally judge whether or not a PSA can be water-peeled from a member. Especially, with a highly transparent optical PSA suited for display device, it is hard to externally detect a change in adhesive strength. Thus, the water-peeling possibility judgement may typically be a step of actually trying peeling the PSA by water-peeling. The water-peeling is defined as described above and details are as described later. Thus, particulars are omitted here. The joined object separation method disclosed herein is preferably implemented in an embodiment comprising a water-peeling possibility judging step. According to the above method, it is possible to efficiently and effectively achieve removal of a now non-water-peelable PSA whose water-peeling properties has been impaired due to the sort of prolonged joining.

(Bonding State of PSA)

It is noted that before the steam-peeling, it is difficult to remove the PSA (typically a PSA sheet) from a member to which the PSA is tightly bonded by normal peeling. For instance, the PSA may be bonded to the member with an adhesive strength corresponding to a normal peel strength of 10 N/20 mm or greater. The normal peel strength is determined in an environment at 23° C. and 50% RH with a force gauge fixed to an end of the joined object, by holding the force gauge by hand and manually peeling at a peel angle of 90° to 150° at a peeling speed of 10 mm/min to 100 mm/min. The normal peel strength is, for instance, 15 N/20 mm or greater, possibly 20 N/20 mm or greater, or even 25 N/20 mm or greater (typically 28 N/20 mm or greater). As for a PSA bonded to a member with such an adhesive strength, removal from the adherend member by a typical peeling method is difficult, or smooth peeling is difficult with the adherend likely to be damaged, etc.; and it may be judged to be non-peelable as some Examples described later. The method disclosed herein is preferably applied to such a PSA. It is noted that in the normal peel strength measurement, as the force gauge, it is possible to use SATOTECH® DIGITAL FORCE GAUGE FG-5100 or a comparable product. The same is true with the water-peel strength, in-hot-water peel strength and steam-peel strength described below.

In addition, before the steam-peeling, it is difficult to remove the PSA (typically a PSA sheet) from a member to which the PSA is tightly bonded by water-peeling. For instance, the PSA may be bonded to the member with an adhesive strength corresponding to a water-peel strength of 10 N/20 mm or greater. The water-peel strength is determined in an environment at 23° C. and 50% RH with a force gauge fixed to an end of the joined object, by holding the force gauge by hand, supplying 20 µL of distilled water to the peel front line (where the PSA starts to separate from the adherend member) and manually peeling at a peel angle of 90° to 150° at a peeling speed of 10 mm/min to 100 mm/min. The water-peel strength is, for instance, 15 N/20 mm or greater, possibly 20 N/20 mm or greater, or even 25 N/20 mm or greater (typically 28 N/20 mm or greater). As for a PSA bonded to a member with such an adhesive strength, removal from the adherend member by water-peeling is difficult, or smooth peeling is difficult with the adherend likely to be damaged, etc.; and it may be judged to be non-peelable as some Examples described later. The method disclosed herein is particularly favorably applied to such a PSA.

Furthermore, before the steam-peeling, it may be difficult to remove the PSA (typically a PSA sheet) from a member to which the PSA is tightly bonded by hot water immersion water-peeling (or in-hot-water peeling). For instance, the PSA may be bonded to the member with an adhesive strength corresponding to an in-hot-water peel strength of 10 N/20 mm or greater. The in-hot-water peel strength is determined with a force gauge fixed to an end of the PSA-containing joined object entirely immersed in hot water at 60° C., by holding the force gauge by hand and manually peeling at a peel angle of 90° to 150° at a peeling speed of 10 mm/min to 100 mm/min. The in-hot-water peel strength is, for instance, 12 N/20 mm or greater, or possibly even 15 N/20 mm or greater (typically 28 N/20 mm or greater). As for a PSA bonded to a member with such an adhesive strength, removal from the adherend member by in-hot-water peeling is difficult, or smooth peeling is difficult with the adherend likely to be damaged, etc.; and it may be judged to be non-peelable as some Examples described later. The method disclosed herein is preferably applied to such a PSA.

For instance, the PSA (typically a PSA sheet) tightly bonded to a member may be bonded to the member with an adhesive strength corresponding to a steam-peel strength lower than 10 N/20 mm. The steam-peel strength is determined with a force gauge fixed to an end of the PSA-containing joined object, by holding the force gauge by hand and manually peeling at a peel angle of 90° to 150° at a peeling speed of 10 mm/min to 100 mm/min while spraying steam at the PSA's peel front line. With a PSA bonded to a member with such an adhesive strength, the effect of the method disclosed herein is preferably obtained. In the steam-peel strength measurement, steam is sprayed using a steam sprayer (product name STM-304N available from Iris Ohyama Inc.), at 3 atm, at a temperature of 70° C. to 80° C. at 1 cm of distance from the nozzle orifice.

<Water-Peeling>

The water-peeling is defined as described above. In particular, it refers to a water-peel step in which the PSA is peeled from a member, in a state where an aqueous liquid exits at the interface between the member and the PSA at the front line of peeling the PSA from the member, with the aqueous liquid allowed to further enter the interface following the movement of the peel front line.

As the aqueous liquid used in the peeling method, water or a mixed solvent primarily comprising water with a small amount of an additive as necessary can be used. As for other solvents forming the mixed solvent besides water, a lower alcohol (e.g., ethanol), lower ketone (e.g., acetone) and the like that are miscible with water can be used. As the additives, known surfactants and the like can be used. From the standpoint of avoiding contamination of the adherend, in some embodiments, an aqueous liquid essentially free of additives can be preferably used. From the standpoint of environmental health, it is preferable to use water as the aqueous liquid. The water is not particularly limited. For instance, distilled water, ion-exchanged water, tap water or the like can be used in view of the purity, availability, etc., required for the application. The temperature of the aqueous liquid is typically in a room temperature range (10° C. to 35° C.). It is also possible to use hot (warm) water at 35° C. or higher and below 90° C. (e.g., 40° C. or higher and 60° C. or lower).

In some embodiments, the water-peeling can be carried out in an embodiment where the aqueous liquid is supplied near an edge of the PSA (layer) adhered to a member; the aqueous liquid is allowed to enter the interface between the PSA and the member; and subsequently, peeling of the PSA is allowed to proceed without another supply of water (i.e., by using only the aqueous liquid supplied onto the member before the peel initiation). During the water-peel step, if the water entering the interface between the PSA and the member(s) following the movement of the peel front line runs out in the middle of peeling, additional water may be supplied intermittently or continuously after the start of the water-peel step.

The amount of aqueous liquid supplied before the start of peeling is not particularly limited as long as the aqueous liquid can be introduced from outside the bonding area of the PSA (layer) into the interface between the PSA and the member. The amount of the aqueous liquid can be, for instance, 5 µL or greater, 10 µL or greater, or even 20 µL or greater. There are no particular limitations to the maximum amount of the aqueous liquid. In some embodiments, from the standpoint of facilitating the work, the amount of the aqueous liquid can be, for instance, 10 mL or less, 5 mL or less, 1 mL or less, 0.5 mL or less, 0.1 mL or less, or even 0.05 mL or less.

At the start of peeling, the procedure for allowing the aqueous liquid to enter the PSA (layer)/member interface through an edge of the PSA can be carried out, for instance, by ways of inserting the tip of a tool such as cutting knife or needle into the interface at the PSA edge; scratching and lifting the PSA edge with a sort of hook or fingernail; lifting an edge of the PSA by sticking a sort of highly-adhesive PSA tape or sucker to the backside near the corresponding edge of the joined object, and so on.

The water-peel step according to some embodiments can be preferably implemented in an embodiment where the peel front line is allowed to move at a speed of at least 10 mm/min. Moving the peeling front line at a speed of at least 10 mm/min is comparable to peeling the PSA (layer) at a tensile speed of at least 20 mm/min, for instance, when the peel angle is 180°. The speed for moving the peeling front line can be, for instance, 50 mm/min or higher, 150 mm/min or higher, 300 mm/min or higher, or 500 mm/min or higher. The maximum speed at which the peel front line moves is not particularly limited. The speed at which the peel front line moves can be, for instance, 1000 mm/min or lower.

The water-peeling disclosed herein can be practiced, for instance, in an embodiment where the peeling area of PSA (layer) per 10 µL volume of aqueous liquid (e.g., water) used in the method is, for instance, 50 cm$^2$ or larger, or preferably 100 cm$^2$ or larger.

<Members Constituting Joined Object>

The joined object disclosed herein is for use in a display device. Examples of the display device include a liquid crystal display device, organic EL display device, PDP, and electronic paper. The art disclosed herein is preferably applied, especially when an expensive member is included, such as a foldable display device and a display device installed in a vehicle. The display device also encompasses a display device with input capabilities such as a touch panel. With strong demands for recycling, reuse and the like, it is particularly significant to apply the art disclosed herein to the display device.

The joined object for display device is not particularly limited as long as it includes two members joined with a PSA (typically a PSA layer). It can be formed of two or more members. For instance, it can be a multilayer structure in which two or more layer-like objects are laminated. Such a joined object (typically a multilayer structure) may include a display member, an optical member such as a transparent member, and other functional members. As for a joined object having such a multilayer structure including several different kinds of members, the joined object separation method disclosed herein can be carried out to effectively reutilize members included in used products. For instance, in various display devices, the members may be adhered to the PSA for purposes such as fixing, joining, shaping, decoration, protection, and support.

In the display device, the PSA-joined display member serves a display function in the display device. Besides this feature, it is not particularly limited. For instance, it can be formed with the inclusion of various materials (including optical materials, luminescent elements, etc.). The display member can be, for instance, a liquid crystal display panel, organic EL display panel, PDP, touch panel, display unit thereof, etc. The word panel may be referred to as sheet or film. The display member's shape is not particularly limited. For instance, it has a sheet or plate form. The display member may also have a curved form. It can be deformable or flexible. Such a display member is favorable as, for instance, a display member of a foldable or flexible display device.

The display member's thickness is not limited to a specific range. For instance, it can be 0.1 mm to 5 mm (e.g., 0.5 mm to 2 mm). For instance, in peeling a PSA off a display member having a thickness of 2 mm or less (e.g., 1 mm or less, or even 300 µm or less, typically 100 µm or less), it is effective to apply the art disclosed herein to separate members without damaging the display member having low strength for being thin. The display member may have a thickness of about 50 µm or less, or even 30 µm or less.

A favorable example of the members constituting the joined object for display device is an optical member. As used herein, the optical member refers to a member having optical properties (e.g., polarizability, light refractivity, light scattering properties, light reflectivity, light transmission, light absorption, light diffraction, optical rotation, visibility, etc.) in a display device (typically an image display device). Examples of the optical member include components of a device (optical device) such as a display device (an image display unit) and an input device as well as a member used for these devices, for instance, a polarizing plate, waveplate, retardation plate, optical compensation film, glaring film, light guide plate, reflective film, anti-reflection film, hard coat (HC) film, impact-absorbing film, anti-fouling film, photochromic film, light control film, transparent conductive film (ITO film), design film, decorative film, surface protection plate, prism, lens, color filter, transparent substrate, and laminates of these (or collectively referred to as "functional films") The "plate" and "film" individually encompass forms of plate, film, sheet, etc. For instance, the "polarizing film" encompasses a "polarizing plate", "polarizing sheet" and the like.

While no particular limitations are imposed, examples of the optical member include members (e.g., members in a form of sheets, films or plates) formed of glass, acrylic resin, polycarbonate, polyethylene terephthalate, metal foil, etc. As used herein, the "optical member" includes a member (design film, decoration film, surface protective film, etc.) that serves to provide decoration or protection while maintaining the visibility of the display device.

The material forming at least the surface of the optical member can be, for instance, glass such as an alkaline glass plate or non-alkaline glass; metals such as stainless steel (SUS) and aluminum; ceramic materials such as alumina and silica; resin materials such as acrylic resin, ABS resin, polycarbonate resin, polystyrene resin and transparent polyimide resin; or the like. Favorable examples of the member include members comprising inorganic materials such as the aforementioned glass, ceramic materials and metals. The members can be optical members whose surfaces to which the PSA is applied are at least partially formed of such a material.

The members constituting the joined object may have painted surfaces coated with paints based on acrylates, polyesters, alkyds, melamine, urethanes or acid/epoxy crosslinking; or paints based on composites thereof (e.g., based on acrylic melamine or alkyd melamine), etc. They may also have plated surfaces such as galvanized steel plates.

In some preferable embodiments, the members constituting the joined object include a glass member comprising a brittle material (typically a hard brittle material) such as glass. For instance, the joined object separation method disclosed herein is preferably applied to a joined object in which at least one of two members joined with a PSA is formed of a brittle material such as a glass material. As for a hard brittle material such as glass, being unable to bear the force peeling the PSA adhered thereto, it may get damaged. However, by employing the method disclosed herein, the PSA can be peeled off the member without causing damage to the adherend such as glass. Typical examples of the glass member include a glass plate having a plate form.

The glass member's size is not limited to a specific range. The glass member (e.g., glass plate) may have a thickness of, for instance, 0.1 mm to 5 mm (e.g., 0.5 mm to 2 mm) and a length of, for instance, 5 mm to 1 m (e.g., 50 mm or greater, further 100 mm or greater, and 500 mm or less). The method disclosed herein is preferably employed when peeling a PSA off a glass member in such size. The length of a glass member (e.g., a glass plate) refers to the maximum length included in in-plane directions of the glass member.

In some preferable embodiments, of the two members constituting the joined object, one is a glass member and the other is a display member. Even when the PSA-joined members include a hard brittle glass member and a display member (e.g., a thin member of 2 mm or less in thickness), by carrying out steam peeling, the method disclosed herein can separate the two members without damaging (typically breaking or tearing) the glass member or the display member. In this embodiment, while no particular limitations are imposed, from the standpoint of facilitating the peeling, it is preferable to supply steam for steam peeling to the peel front line between the glass member and the PSA.

The members may have hydrophilized surfaces. For instance, they can be aforementioned optical members whose surfaces have been subjected to treatment that helps increase the hydrophilicity, such as corona treatment, plasma treatment, and hydrophilic coating by which a hydrophilic coating layer is provided. Members and the like having such hydrophilized surfaces have increased hydrophilicity with water contact angles limited up to certain values and thus are suitable for removal of a hydrophilicity enhancer-containing PSA.

In an embodiment where the members constituting the joined object have plate or sheet forms, the maximum thickness of a member is about 5 mm or less (e.g., 2 mm or less, favorably 1 mm or less). In typical, a member having such a maximum thickness is likely to be deformed or damaged by external force. However, by applying the method disclosed herein, the PSA can be smoothly peeled off the member without damaging the member. The thickness of the member having a plate or sheet form can be, for instance, 0.1 mm to 5 mm (e.g., 0.5 mm to 2 mm).

As for the joined object having PSA-joined members, at least a certain period of time may have passed after joined with PSA. For instance, with respect to a product comprising a joined object, the PSA-joined state may remain until post-use collection for recycling and like purpose, or even until the product completes its lifetime (e.g., 6 months or longer, even 1 year or longer, or possibly 3 years or longer, 5 years or longer). Due to the usage environment, etc., such a PSA may have an excessive increase in adhesive strength, sometimes making the intended removal difficult. For instance, even with a hydrophilicity enhancer-containing water-peelable PSA that can be removed by water-peeling using an aqueous liquid, after a prolonged period, desirable water-peeling properties may be lost, making the removal difficult. With respect to a joined object comprising a PSA in such a state, by applying the art disclosed herein, the joined object is preferably separated.

As for the joined object-containing display device, highly reliable PSA-bonding is required for member joining. On the other hand, it can be a component of an electronic device (favorably a mobile electronic device) for which its smooth removal is required for parts repair, replacement, examination, recycle and so on. For instance, it can be a component of a mobile electronic device, whose examples include mobile phones, smartphones, tablet PCs, notebook PCs, various wearable devices (e.g., wrist wearables put on wrists such as wrist watches; modular devices attached to bodies with clips, straps, etc.; eye wears including eye glass types (monocular or binocular, including head-mounted pieces); clothing types worn as, for instance, accessories on shirts, socks, hats/caps, etc.; ear-mounted pieces put on ears such as earphones), digital cameras, digital video cameras, acoustic equipment (portable music players, IC recorders, etc.), computing devices (calculators, etc.), portable game devices, electronic dictionaries, electronic notebooks, electronic books, automotive information systems, portable radios, portable televisions, portable printers, portable scanners, and portable modems. The display device can be a component of an electronic device such as a desktop PC or display, television (liquid crystal, plasma, organic EL, etc.), or the like. As used herein, to be "mobile," it is not sufficient that it can be just carried, but it needs to be mobile enough for an individual (an average adult) to be able to carry it by hand relatively easily.

<PSA>

In the joined object, the form of member-joining PSA is not particularly limited. For instance, it may have a regular or random pattern of dots, stripes or the like, joining the members. In typical, it has a PSA sheet form or a PSA layer form as a continuously-formed layer. For instance, the PSA can be formed as a supportless adhesively double-faced PSA sheet, or as an adhesively double-faced PSA sheet (double-faced PSA sheet) having a middle layer such as a substrate layer. This PSA sheet has a structure in which the first and second PSA layers are provided to the respective faces (both non-releasable) of the middle layer.

The PSA layer in the PSA sheet is not limited to a monolayer structure, and it may further have one, two or more PSA layers having the same or different compositions. For instance, in the middle-layer-containing PSA sheet, the middle layer can be a PSA layer. In this case, the PSA sheet may have at least three PSA layers including the first and second PSA layers forming the surface of the PSA sheet as well as the PSA layer as the middle layer.

In the joined object, the PSA (possibly having a PSA layer or PSA sheet form; the same applies hereinafter unless otherwise noted) used for member joining may be formed comprising one, two or more species of PSA selected among various kinds of known PSA such as acrylic PSA, rubber-based PSA (based on natural rubber, synthetic rubber, a mixture of these, etc.), silicone-based PSA, polyester-based PSA, urethane-based PSA, polyether-based PSA, polyamide-based PSA, and fluorine-based PSA. Here, the acrylic PSA refers to a PSA whose primary component (base polymer) is an acrylic polymer. The same applies to the rubber-based PSA and other PSA.

The "base polymer" of a PSA refers to the main component among rubber-like polymers in the PSA. Besides this, the interpretation is subject to no other limitations. The rubber-like polymer refers to a polymer that shows rubber elasticity in a temperature range near room temperature. As used herein, the "main component" refers to the highest-content (most abundant) component by weight among the components included. Accordingly, for instance, when a PSA consists of three or more components, the amount of the main component in the PSA can be 34% by weight or greater.

As used herein, the term "acrylic polymer" refers to a polymer derived from a starting monomer mixture including more than 50% acrylic monomer by weight, or an acrylic polymer. The acrylic monomer refers to a monomer having at least one (meth)acryloyl group per molecule. As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

(Acrylic PSA)

In some embodiments, as the material forming the PSA, acrylic PSA can be preferably used. In particular, the PSA disclosed herein can be an acrylic PSA comprising an acrylic polymer. Acrylic PSA tends to have excellent transparency, weatherability and design freedom. Highly transparent acrylic PSA is preferably used in optical applications and further for joining applications for display devices.

As for the PSA disclosed herein, for instance, a preferable acrylic PSA comprises, as the base polymer, an acrylic polymer formed from monomers including at least 33% (by weight) alkyl (meth)acrylate having a linear or branched alkyl group with 1 up to 20 carbon atoms at the ester terminus. Hereinafter, an alkyl (meth)acrylate having, at the ester terminus, an alkyl group with X up to Y number of carbon atoms may be referred to as an "$C_{X-Y}$ alkyl (meth) acrylate." For easy balancing of properties, the ratio of $C_{1-20}$ alkyl (meth)acrylate in the entire monomers (all monomers) of the acrylic polymer according to some embodiments is, for instance, 35% by weight or higher, suitably 50% by weight or higher, or possibly 55% by weight or higher. The ratio of $C_{1-20}$ alkyl (meth)acrylate among the monomers can be, for instance, 99.9% by weight or lower, 99% by weight or lower, or even 95% by weight or lower. From the standpoint of the PSA's cohesion, etc., the ratio of $C_{1-20}$ alkyl (meth)acrylate in all monomers of the acrylic polymer according to some embodiments can be, for instance, 85% by weight or lower, 75% by weight or lower, or even 65% by weight or lower. For the $C_{1-20}$ alkyl (meth)acrylate, solely one species or a combination of two or more species can be used.

Among these, it is preferable to use at least a $C_{4-30}$ alkyl (meth)acrylate and it is more preferable to use at least a $C_{4-18}$ alkyl (meth)acrylate. For example, as the monomer(s), one or each of n-butyl acrylate (BA) and 2-ethylhexyl acrylate (2EHA) is preferably included. An acrylic PSA including at least BA is particularly preferable. For the $C_{4-18}$ alkyl (meth)acrylate, solely one species or a combination of two or more species can be used.

In addition to the alkyl (meth)acrylate, the monomers forming the acrylic polymer may include, as necessary, another monomer (copolymerizable monomer) that is able to copolymerize with the alkyl (meth)acrylate. As the copolymerizable monomer, it is possible to suitably use a monomer having a polar group (e.g., a carboxy group, a hydroxy group, a nitrogen atom-containing ring, etc.) or a monomer having a relatively high (e.g., 10° C. or higher) homopolymer glass transition temperature. The monomer having a polar group may be useful for introducing a cross-linking point into the acrylic polymer or increasing cohesive strength of the PSA. For the copolymerizable monomer, solely one species or a combination of two or more species can be used.

Non-limiting specific examples of the copolymerizable monomer include carboxy group-containing monomers, acid anhydride group-containing monomers, hydroxy group-containing monomers, sulfonate or phosphate group-containing monomers, epoxy group-containing monomers, cyano group-containing monomers, isocyanate group-containing monomers, amide group-containing monomers, amino group-containing monomers, monomers having N-containing rings, monomers having succinimide structures, maleimides, aminoalkyl (meth)acrylates, alkoxy group-containing monomers, alkoxysilyl group-containing monomers, vinyl esters, vinyl ethers, aromatic vinyl compounds, olefins, (meth)acrylates having alicyclic hydrocarbon groups, (meth)acrylates having aromatic hydrocarbon groups; as well as heteroring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth)acrylates such as silicone (meth)acrylate, and (meth)acrylic esters obtained from terpene compound derivative alcohols. In particular, carboxy group-containing monomers, hydroxy group-containing monomers, monomers having N-containing rings and (meth)acrylates having alicyclic hydrocarbon groups are preferable.

Examples of carboxy group-containing monomers as favorable examples of the copolymerizable monomer include acrylic acid, methacrylic acid, carboxyethyl acrylate, carboxypentyl acrylate, itaconic acid, maleic acid, fumaric acid, crotonic acid and isocrotonic acid.

Examples of hydroxy group-containing monomers include hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate.

Examples of monomers having N-containing rings include N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (e.g., lactams including N-vinyl-2-caprolactam).

Examples of (meth)acrylates having alicyclic hydrocarbon groups include alicyclic hydrocarbon group-containing (meth)acrylates such as cyclopentyl (meth)acrylate, cyclohexyl (meth)acrylate, isobornyl (meth)acrylate, dicyclopentanyl (meth)acrylate, and adamantyl (meth)acrylate.

When using such a copolymerizable monomer, its amount used is not particularly limited. For instance, it is suitably at least 0.01% by weight of the entire monomers. From the standpoint of obtaining greater effect of the use of the copolymerizable monomer, the amount of copolymerizable monomer used can be 0.1% by weight or more of the entire monomers, or even 0.5% by weight or more. For easy balancing of adhesive properties, the amount of copolymerizable monomer used is suitably 60% by weight or less of the entire monomers, possibly 50% by weight or less, or even 40% by weight or less.

In some embodiments, the monomers forming the acrylic polymer may include a hydroxy group-containing monomer. With the use of hydroxy group-containing monomer, the PSA's cohesive strength and crosslinking degree (e.g., crosslinking by an isocyanate crosslinking agent) can be favorably adjusted. As the hydroxy group-containing monomer, the examples listed earlier and the like can be used. For instance, 2-hydroxyethyl acrylate (HEA) and 4-hydroxybutyl acrylate (4HBA) can be preferably used. For the hydroxy group-containing monomer, solely one species or a combination of two or more species can be used. When using a hydroxy group-containing monomer, its amount used is not particularly limited. In some preferable embodiments, the amount of hydroxy group-containing monomer is 15% by weight or more of all monomers, suitably 20% by weight or more, or preferably 25% by weight or more. From the standpoint of reducing the PSA's water absorption, in some embodiments, the amount of hydroxy group-containing monomer is, for instance, suitably 50% by weight or less (e.g., 45% by weight or less) of all monomers, possibly 40% by weight or less, 30% by weight or less, or even 20% by weight or less.

In some embodiments, the monomers forming the acrylic polymer may include an alicyclic hydrocarbon group-containing (meth)acrylate. This can increase the PSA's cohesive strength. As the alicyclic hydrocarbon group-containing (meth)acrylate, the aforementioned examples and the like can be used. For instance, cyclohexyl acrylate (CHA) and isobornyl acrylate can be preferably used. For the alicyclic hydrocarbon group-containing (meth)acrylate, solely one species or a combination of two or more species can be used. When using an alicyclic hydrocarbon group-containing (meth)acrylate, its amount used is not particularly limited. For instance, it can be 1% by weight or more of all monomers, 5% by weight or more, or even 10% by weight or more. The maximum amount of alicyclic hydrocarbon group-containing (meth)acrylate is suitably about 40% by weight or less, or possibly even 25% by weight or less (e.g., 15% by weight or less).

In some embodiments, the monomers forming the acrylic polymer may include a monomer having a nitrogen atom (N). This can increase the PSA's cohesive strength. As the nitrogen atom-containing monomer, the examples listed earlier and the like can be used. A favorable example of the nitrogen atom-containing monomer is a monomer having a N-containing ring. Examples include cyclic N-vinyl amides. In particular, N-vinyl-2-pyrrolidone can be preferably used. For the N-containing monomer, solely one species or a combination of two or more species can be used. The amount of N-containing monomer (preferably a monomer having a N-containing ring) is not particularly limited. For instance, it can be 1% by weight or more of all monomers, 5% by weight or more, or even 10% by weight or more. Of all monomers, the amount of N-containing monomer is, for instance, suitably 40% by weight or less, possibly 30% by weight or less, or even 15% by weight or less.

In some embodiments, the ratio of carboxy group-containing monomer in the monomers of the acrylic polymer can be, for instance, below 10% by weight, below 3% by weight, or even below 1% by weight (e.g., below 0.1% by weight). Carboxy group-containing monomers may not substantially used as the monomers of the acrylic polymer. Here, that carboxy group-containing monomers are not substantially used means that carboxy group-containing monomers are not used at least intentionally. Acrylic polymer having such a composition is likely to have metal corrosion-inhibiting properties on a metal-containing adherend.

The composition of the monomers forming the acrylic polymer can be selected so that the glass transition temperature determined by the Fox equation based on the monomer composition is −75° C. or higher and 10° C. or lower. In some embodiments, from the standpoint of the adhesive strength, etc., the Tg is suitably 0° C. or lower, preferably −10° C. or lower, more preferably −20° C. or lower, or possibly −30° C. or lower. From the standpoint of the cohesion, etc., the Tg can be, for instance, −60° C. or higher, −50° C. or higher, −45° C. or higher, or even −40° C. or higher.

Here, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i. As the glass transition temperatures of homopolymers used for determining the Tg value, the values used are found in a known document, in particular, in "*Polymer Handbook*" (3rd edition, John Wiley & Sons, Inc., Year 1989). When the literature provides two or more values, the highest value is used.

In the polymerization, a known or commonly used thermal polymerization initiator or photopolymerization initiator can be used in accordance with the polymerization method and polymerization conditions. The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators. For the polymerization initiator, solely one species or a combination of two or more species can be used. Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g., about 0.01 part to 1 part by weight) of polymerization initiator can be used.

In the polymerization, various kinds of heretofore known chain transfer agent (which may also be thought as molecular weight-adjusting agent or polymerization degree-adjusting agent) can be used as necessary. As the chain transfer agent, mercaptans can be preferably used, such as n-dodecyl mercaptan, t-dodecyl mercaptan, thioglycolic acid and α-thioglycerol. Alternatively, a chain transfer agent free of sulfur atoms (a sulfur-free chain transfer agent) can be used as well. For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

The molecular weight of the acrylic polymer obtained by suitably employing the aforementioned various polymerization methods is not particularly limited and can be selected in a range suited for required properties. The acrylic polymer suitably has a weight average molecular weight (Mw) of, for instance, about $10 \times 10^4$ or higher. From the standpoint of combining well-balanced cohesive strength and adhesive strength, it is suitably above $30 \times 10^4$. The acrylic polymer according to some embodiments preferably has a Mw of about $50 \times 10^4$ or higher. The maximum Mw of the acrylic polymer can be about $500 \times 10^4$ or lower (e.g., about $150 \times 10^4$ or lower). The Mw can also be about $75 \times 10^4$ or lower. The Mw here refers to the value based on standard polystyrene determined by gel permeation chromatography (GPC). As the GPC system, for instance, model name HLC-8320 GPC (column: TSKgel GMH-H(S) available from Tosoh Corporation) can be used.

The PSA disclosed herein can be formed using a PSA composition that includes monomers having an aforementioned composition in a polymer form, in a non-polymerized form (i.e., a form where polymerizable functional groups are unreacted), or as a mixture of these. The PSA composition may exist in various forms such as a water-dispersed PSA composition in which the PSA (adhesive component) is dispersed in water, a solvent-based PSA composition containing the PSA in an organic solvent, an active energy ray-curable PSA composition prepared to form PSA when cured by active energy rays such as UV rays and radioactive rays, a hot-melt PSA composition that is applied in a thermally melted state and forms PSA when cooled to near room temperature. The PSA composition according to some embodiments can be a solvent-based PSA composition or a solvent-free PSA composition. The solvent-free PSA composition encompasses an active energy ray-curable PSA composition and a hot-melt PSA composition.

The PSA composition according to some embodiments can be an active energy ray-curable PSA composition. The term "active energy ray" in this Description refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as a rays, β rays, γ rays, electron beam, neutron radiation, and X rays. A favorable example of the active energy ray-curable PSA composition is a photocurable PSA composition. The photocurable PSA composition has an advantage of being able to easily form even a thick PSA layer. In particular, a UV ray-curable PSA composition is preferable.

The photocurable PSA composition typically comprises at least some of the monomers used to form the composition (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV ray, etc. (typically in the presence of a photopolymerization initiator); radioactive ray polymerization carried out by irradiating radioactive rays such as β rays, γ rays, etc.; and the like. In particular, photopolymerization is preferable.

The photocurable PSA composition according to some preferable embodiments comprises a partial polymer (partial polymerization product, e.g., a partial acrylic polymer) of the monomers. Such a partial polymer is typically a mixture of a polymer derived from the monomers and unreacted monomers, and it preferably has a syrup form (viscous liquid). Hereinafter, a partial polymer having such a form may be referred to as "monomer syrup" or simply "syrup." The polymerization method for partial polymerization of the monomers is not particularly limited. Various polymerization methods such as those described earlier can be suitably selected and used. From the standpoint of the efficiency and convenience, a photopolymerization method can be preferably used. Photopolymerization allows easy control of the monomer conversion of the monomers through the polymerization conditions such as the radiation dose (amount) of light.

The monomer conversion of the monomer mixture in the partial polymer is not particularly limited. The monomer conversion can be, for instance, about 70% by weight or less. From the standpoint of the ease of preparing the PSA composition containing the partial polymer, the ease of coating, etc., it is suitably about 50% by weight or less, or preferably about 40% by weight or less. The minimum monomer conversion is not particularly limited. It is about 1% by weight or greater, or usually suitably about 5% by weight or greater.

The partial polymer-containing PSA composition may include other components (e.g., photopolymerization initiator as well as hydrophilicity enhancer, crosslinking agent, polyfunctional monomer, acrylic oligomer, tackifier resin, silane coupling agent and the like described later) used as necessary. The method of adding such other components is not particularly limited. For instance, it can be included in the monomer mixture in advance or added to the partial polymer as well.

The PSA according to some preferable embodiments is formed from a water-dispersed PSA composition. Typical examples of the water-dispersed PSA composition include an emulsion-based PSA composition. The emulsion-based PSA composition typically comprises a polymerization product of monomers and an additive used as necessary. Emulsion polymerization of the monomers is usually carried out in the presence of an emulsifier. By emulsion polymerization, a polymerization reaction mixture is obtained as an emulsion in which the polymerization product (polymer) of the monomers is dispersed in water. The water-dispersed PSA composition used for forming the PSA can be preferably produced using the polymerization reaction mixture.

The emulsifier used in the emulsion polymerization is not particularly limited; known anionic emulsifiers, nonionic emulsifiers and the like can be used. These emulsifiers can be used singly as one species or in a combination of two or more species. Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. From the standpoint of increasing the water-resistant adhesive strength or increasing the PSA's transparency, in some embodiments, the amount of emulsifier used is usually suitably 10 parts by weight or less to 100 parts by weight of the monomers, preferably 5 parts by weight or less, or possibly even 3 parts by weight or less. It is noted that the emulsifier used here for emulsion polymerization can also serve as the hydrophilicity enhancer described later.

The PSA composition according to some embodiments can be a solvent-based PSA composition. The solvent-based PSA composition typically includes a solution polymerization product of the monomers and additives (e.g., hydrophilicity enhancer) used as necessary. The solvent (polymerization solvent) used for the solution polymerization can be suitably selected among heretofore known organic solvents (e.g., toluene, ethyl acetate, etc.). Solution polymerization gives the polymerization reaction mixture in a form where the polymerization product of the monomers is dissolved in a polymerization solvent. The solvent-based PSA composition disclosed herein can be preferably produced using the polymerization reaction mixture.

(Hydrophilicity Enhancer)

The PSA comprises a hydrophilicity enhancer. With the inclusion of hydrophilicity enhancer in the PSA, in typical, an aqueous liquid such as water can be used to effectively reduce the peel strength, enhancing the water-peeling properties. While reasons for this are not limited to particular interpretation, it is presumed that hydrophilicity enhancers generally have hydrophilic regions and thus are likely to be concentrated in the PSA surface; this efficiently increases the hydrophilicity of the PSA surface and effectively reduces the peel strength when the PSA makes contact with water, enhancing the water-peeling properties. However, as for the member-joining PSA in the joined object, because of conditions such as having been used for a prolonged period, the water-peeling properties that the PSA originally had are not displayed, turning it into a now non-water-peelable PSA with lost water-peeling properties that is difficult to remove by water-peeling. Even with such a hydrophilicity enhancer-containing PSA with lost water-peeling properties, by applying the art disclosed herein, the PSA can be peeled off the members joined with the PSA. In typical, the hydrophilicity enhancer is included in a free state in the PSA composition (and further in the PSA). As the hydrophilicity enhancer, from the standpoint of the ease of preparing the PSA composition, it is preferable to use a species that exits as liquid at room temperature (about 25° C.). For the hydrophilicity enhancer, solely one species or a combination of two or more species can be used.

The HLB of the hydrophilicity enhancer (typically a surfactant) is not particularly limited. It is, for instance, 3.0 or higher, suitably about 5.0 or higher, preferably 8.0 or higher, more preferably 10 or higher, or yet more preferably 13 or higher (e.g., 15 or higher). When the PSA (e.g., an acrylic polymer-containing PSA) comprises a hydrophilicity enhancer having an HLB in these ranges, even if the water-peeling properties are impaired, it can be smoothly removed from the member by steam peeling. The maximum HLB is 20 or lower, for instance, possibly 18 or lower, or even 16 or lower (e.g., 15 or lower).

HLB in this Description is hydrophile-lipophile balance by Griffin, and the value indicates the degree of affinity of a surfactant to water and oil, and the ratio between hydrophilicity and lipophilicity is represented by a numerical value between 0 and 20. HLB is defined in J. Soc. Cosmetic Chemists, 1, 311 (1949) by W. C. Griffin; "Surfactant Handbook" by Koshitami Takahashi, Yoshiro Namba, Motoo Koike and Masao Kobayashi, 3rd edition, Kogaku Tosho Publishing, Nov. 25, 1972, p 179-182; and the like. A hydrophilicity enhancer having such HLB can be selected based on technical common knowledge of those skilled in the art, taking into account these reference documents as necessary.

In some embodiments, as the hydrophilicity enhancer, it is possible to use at least one species of compound selected among surfactants and compounds having polyoxyalkylene backbones. As that the surfactant and the compound having a polyoxyalkylene backbone, one, two or more species can be used among known surfactants and compounds having polyoxyalkylene backbones without particular limitations. It is needless to say that among the surfactants, there are compounds having polyoxyalkylene backbones, and the reverse is true as well.

As for the surfactant possibly used as the hydrophilicity enhancer, known nonionic surfactant, anionic surfactant, cationic surfactant and the like can be used. Among them, nonionic surfactant is preferable. As the surfactant, solely one species or a combination of two or more species can be used.

Examples of the nonionic surfactant include polyoxyethylene alkyl ethers such as polyoxyethylene lauryl ether, polyoxyethylene cetyl ether, polyoxyethylene stearyl ether and polyoxyethylene oleyl ether; polyoxyethylene alkyl phenyl ethers such as polyoxyethylene octyl phenyl ether and polyoxyethylene nonyl phenyl ether; sorbitan fatty acid esters such as sorbitan monolaurate, sorbitan monopalmitate, sorbitan monostearate and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate and polyoxyethylene sorbitan trioleate; polyoxyethylene glyceryl ether fatty acid esters; and polyoxyethylene-polyoxypropylene block polymers. Among these nonionic surfactants, solely one species or a combination of two or more species can be used.

Examples of the anionic surfactant include alkyl sulfates such as lauryl sulfate and octadecyl sulfate; fatty acid salts; alkyl benzene sulfonates such as nonyl benzene sulfonate and dodecyl benzene sulfonate; naphthalene sulfonates such as dodecylnaphthalene sulfonate; alkyl diphenyl ether disulfonate such as dodecyl diphenyl ether disulfonate; polyoxyethylene alkyl ether sulfates such as polyoxyethylene octadecyl ether sulfate and polyoxyethylene lauryl ether sulfate; polyoxyethylene alkyl phenyl ether sulfates such as polyoxyethylene lauryl phenyl ether sulfate; polyoxyethylene styrenated phenyl ether sulfate; sulfosuccinates such as lauryl sulfosuccinate and polyoxyethylene lauryl sulfosuccinate; polyoxyethylene alkyl ether phosphates; and polyoxyethylene alkyl ether acetates. When the anionic surfactant is in a salt form, the salt can be, for instance, a metal salt (preferably a monovalent metal salt) such as sodium salt, potassium salt, calcium salt and magnesium salt; ammonium salt; or amine salt. Among these anionic surfactants, solely one species or a combination of two or more species can be used.

As the compound having a polyoxyalkylene backbone that can be used as the hydrophilicity enhancer, it is possible to use, for instance, polyalkylene glycols such as polyethylene glycol (PEG) and polypropylene glycol (PPG); polyethers containing polyoxyethylene units; polyethers containing polyoxypropylene units; compounds containing oxyethylene units and oxypropylene units (the sequence of these units may be random or blocked); and derivatives of these. Among the aforementioned surfactants, a compound having a polyoxyalkylene backbone can be used as well. These can be used solely as one species or in a combination of two or more species. Among them, it is preferable to use a compound containing a polyoxyethylene backbone (or a polyoxyethylene segment). PEG is more preferable.

The molecular weight (chemical formula weight) of the polyoxyalkylene backbone-containing compound (e.g., polyethylene glycol) is not particularly limited. For instance, it is suitably lower than 1000. In view of the ease of preparation of PSA composition, it is preferably about 600 or lower (e.g., 500 or lower). The minimum molecular weight of the polyoxyalkylene backbone-containing compound (e.g., polyethylene glycol) is not particularly limited. A preferably used species has a molecular weight of about 100 or higher (e.g., about 200 or higher, or even about 300 or higher).

The hydrophilicity enhancer content in the PSA is not particularly limited. It can be selected to suitably obtain the effect of using the hydrophilicity enhancer. In some embodiments, the hydrophilicity enhancer content per 100 parts by weight of polymer (e.g., acrylic polymer) in the PSA is, for instance, possibly 0.001 part by weight or higher, suitably 0.01 part by weight or higher, preferably 0.05 part by weight or higher, or more preferably 0.1 part by weight or higher. In other embodiments, the hydrophilicity enhancer content per 100 parts by weight of polymer in the PSA can be, for instance, 1.0 part by weight or higher, or even 1.5 parts by weight or higher. In some embodiments, the amount of hydrophilicity enhancer used per 100 parts by weight of the polymer is possibly about 3 parts by weight or less, suitably about 2 parts by weight or less, preferably less than 1 part by weight, or more preferably less than 0.5 part by weight. With a limited usage of hydrophilicity enhancer, the adhesive strength tends to be easily maintained. In addition, it tends not to impair the optical properties required for display devices. The PSA comprising the limited amount of hydrophilicity enhancer can preferably combine steam peeling properties with optical properties and adhesive strength required for display devices.

(Polyfunctional Monomer)

In the PSA composition (and further in the PSA), a polyfunctional monomer may be used as necessary. The polyfunctional monomer may be helpful for purposes such as adjusting the cohesive strength. During the PSA layer formation or after application to an adherend, when allowed to react with the ethylenically unsaturated group by irradiation of light (e.g., UV light), etc., the polyfunctional monomer may form a crosslinking structure having suitable flexibility. Accordingly, "polyfunctional monomer" here can be called "crosslinking agent" as well. For instance, it is preferable to use a polyfunctional monomer in a PSA formed from a photo-curable PSA composition. As the polyfunctional monomer, a compound having two or more ethylenically unsaturated groups can be used. For the polyfunctional monomer, solely one species or a combination of two or more species can be used.

Examples of the ethylenically unsaturated group that the polyfunctional monomer has include, but are not limited to acryloyl group, methacryloyl group, vinyl group and allyl group. Preferable ethylenically unsaturated groups in view of the photoreactivity include acryloyl group and methacryloyl group. In particular, acryloyl group is preferable.

Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerythritol hexa(meth)acrylate, ethyleneglycol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyldiol (meth)acrylate and hexyldiol di(meth)acrylate. Among them, trimethylolpropane tri(meth)acrylate, 1,6-hexanediol di(meth)acrylate and dipentaerythritol hexa(meth)acrylate are favorable.

The amount of polyfunctional monomer used depends on its molecular weight, the number of functional groups therein, etc. For instance, it is suitably in the range of about 0.01 part to 3.0 parts by weight to 100 parts by weight of the monomers forming the polymer (typically an acrylic polymer or the monomers thereof) in the PSA.

(Crosslinking Agent)

The PSA composition disclosed herein can include a crosslinking agent as necessary, mainly for crosslinking within the PSA (layer) or between the PSA and the adjacent surface. The type of crosslinking agent is not particularly limited and can be selected among heretofore known crosslinking agents so that, for instance, the crosslinking agent provides suitable crosslinking within the PSA in accordance with the composition of the PSA composition. Examples of the crosslinking agent that can be used include isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agents, hydrazine-based crosslinking agent, and amine-based crosslinking agent. These can be used solely as one species or in a combination of two or more species.

The crosslinking agent content (when two or more crosslinking agents are included, the total amount thereof) is not particularly limited. From the standpoint of obtaining a PSA that exhibits well-balanced adhesive properties such as adhesive strength and cohesive strength, the crosslinking agent content is suitably about 5 parts by weight or less to 100 parts by weight of the monomers forming the polymer (e.g., an acrylic polymer or the monomers thereof) in the PSA, preferably about 0.001 part to 5 parts by weight, more preferably about 0.001 part to 4 parts by weight, or yet more preferably about 0.001 part to 3 parts by weight. Alternatively, the PSA composition can also be free of aforementioned crosslinking agents. When using a photocurable PSA composition as the PSA composition disclosed herein, the PSA composition can be essentially free of a crosslinking agent such as an isocyanate-based crosslinking agent. Here, that the PSA composition is essentially free of a crosslinking agent (typically an isocyanate-based crosslinking agent) means that the amount of crosslinking agent relative to 100 parts by weight of the monomers is less than 0.05 part by weight (e.g., less than 0.01 part by weight).

To allow an aforementioned crosslinking reaction to proceed effectively, a crosslinking catalyst may be used. The PSA composition used for forming the PSA may include, as desired, a crosslinking retarder (e.g., a keto-enol tautomeric compound). The amounts of crosslinking catalyst and crosslinking retarder are not limited to specific ranges. They are used in suitable amounts according to the purpose, etc.

(Tackifier Resin)

The PSA may comprise a tackifier resin. Examples of the tackifier resin include rosin-based tackifier resins, rosin derivative tackifier resins, petroleum-based tackifier resins, terpene-based tackifier resins, phenolic tackifier resins, and ketone-based tackifier resins. These can be used singly as one species or in a combination of two or more species. In particular, one, two or more species can be preferably used among rosin-based tackifier resins, rosin derivative tackifier resins and terpene-phenol resins. For instance, it is preferable to use a tackifier resin (favorably a rosin derivative tackifier resin) having a softening point of 80° C. or higher (e.g., 120° C. or higher and 180° C. or lower).

For favorable effect of the use, the amount of tackifier resin used to 100 parts by weight of the monomers forming the polymer in the PSA is suitably 1 part by weight or greater, possibly 5 parts by weight or greater, 10 parts by weight or greater, 15 parts by weight or greater, 20 parts by weight or greater, or even 25 parts by weight or greater. From the standpoint of combining well-balanced cohesion and tightness of adhesion to adherend, the amount of tackifier resin used to 100 parts by weight of the monomers can be, for instance, 50 parts by weight or less, or even 30 parts by weight or less. Alternatively, the tackifier resin content in the PSA can be, for instance, less than 1 part by weight to 100 parts by weight of the monomers. The PSA can also be essentially free of a tackifier resin.

(Acrylic Oligomer)

From the standpoint of increasing the cohesive strength, enhancing the adhesion, etc., the PSA disclosed herein may include an acrylic oligomer. As the acrylic oligomer, it is preferable to use a polymer having a higher Tg than the Tg of the acrylic polymer. For instance, in an embodiment using UV irradiation for preparing the PSA, an acrylic oligomer is favorable as it is less likely to cause inhibition of polymerization.

Examples of favorable acrylic oligomers include homopolymers of various monomers such as dicyclopentanyl methacrylate (DCPMA), cyclohexyl methacrylate (CHMA), isobornyl methacrylate (IBXMA), isobornyl acrylate (IBXA), dicyclopentanyl acrylate (DCPA), 1-adamantyl methacrylate (ADMA) and 1-adamantyl acrylate (ADA) as well as copolymer of DCPMA and methyl methacrylate (MMA), copolymer of DCPMA and IBXMA, copolymer of ADA and MMA, copolymer of CHMA and isobutyl methacrylate (IBMA), copolymer of CHMA and IBXMA, copolymer of CHMA and acryloylmorpholine (ACMO), copolymer of CHMA and diethylacrylamide (DEAA), and copolymer of CHMA and AA. For the acrylic oligomer, solely one species or a combination of two or more species can be used.

The acrylic oligomer may have a Mw of typically about 1000 or higher and lower than about 30000, preferably about 1500 or higher and lower than about 10000, or yet more preferably about 2000 or higher and lower than about 5000. With the Mw in these ranges, favorable effect is likely to be obtained to enhance the cohesion and the adhesion to the adjacent surface. The acrylic oligomer's Mw can be measured by gel permeation chromatography (GPC) and determined based on standard polystyrene. Specifically, it is measured at a flow rate of about 0.5 mL/min, using two TSKgelGMH-H (20) columns as columns and tetrahydrofuran solvent on HPLC 8020 available from Tosoh Corporation.

When an acrylic oligomer is included, its amount can be, for instance, 0.01 part by weight or greater to 100 parts by weight of the base polymer (typically an acrylic polymer). From the standpoint of obtaining greater effect, it may be 0.05 part by weight or greater, or even 0.1 part by weight or greater. From the standpoint of the compatibility with the base polymer, etc., the acrylic oligomer content is preferably less than 30 parts by weight, for instance, possibly 10 parts by weight or less, or even 1 part by weight or less.

(Silane Coupling Agent)

The PSA disclosed herein may comprise a silane coupling agent. In a silane coupling agent-containing embodiment, the PSA composition (further the PSA) preferably comprises the silane coupling agent in the free state. With the inclusion of silane coupling agent, the PSA's adhesive strength on adherends (e.g., a glass member) tends to increase; on the other hand, the increased adhesive strength is likely to result in poorer removability from adherends during removal. Even when the PSA is in such a state (tightly bonded to a member), because of the inclusion of hydrophilicity enhancer, even with impaired water-peeling properties, it can be peeled off the member by steam peeling.

Examples of the silane coupling agent include silicon compounds having an epoxy structure such as 3-glycidoxypropyltrimethoxysilane, 3-glycidoxypropylmethyldimethoxysilane and 2-(3,4-epoxycyclohexyl)ethyltrimethoxysilane; amino group-containing silicon compounds such as 3-aminopropyltrimethoxysilane, N-(2-aminoethyl)3-aminopropyltrimethoxysilane and N-(2-aminoethyl) 3-aminopropylmethyldimethoxysilane; 3-chloropropyltrimethoxysilane; acetoacetyl group-containing trimethoxysilane; (meth) acrylate group-containing silane coupling agents such as 3-acryloxypropyltrimethoxysilane, and 3-methacryloxypropyltriethoxysilane; and isocyanate group-containing silane coupling agents such as 3-isocyanatopropyltriethoxysilane. Particularly preferable examples include 3-glycidoxypropyltrimethoxysilane and acetoacetyl group-containing trimethoxysilane. For the silane coupling agent, solely one species or a combination of two or more species can be used.

The amount of silane coupling agent used can be selected so that desirable effect is obtained by the use, and is not particularly limited. In some embodiments, the silane coupling agent can be used in an amount of, for instance, 0.001 part by weight or greater to 100 parts by weight of the monomers forming the polymer included in the PSA. From the standpoint of obtaining greater effect, it can be 0.005 part by weight or greater, 0.01 part by weight or greater, or even 0.015 part by weight or greater. In some embodiments, the amount of silane coupling agent used can be, for instance, 3 parts by weight or less, 1 part by weight or less, or even 0.5 part by weight or less, relative to 100 parts by weight of the monomers forming the PSA. The art disclosed herein can be implemented in an embodiment using a PSA essentially free of a silane coupling agent. A limited usage of silane coupling agent or nonuse of silane coupling agent tends to enhance the removability from adherends.

(Other Components)

As necessary, the PSA disclosed herein may include, as optional components, various additives generally used in the field of PSA, such as viscosity-adjusting agent (e.g., thickener), pH-adjusting agent, leveling agent, plasticizer, filler, colorant including pigment and dye, etc., stabilizing agent, preservative, anti-aging agent, and so on. The PSA may include a component (heat expandable filler, etc.) that thermally lowers the peel strength, or may be free of such components. The PSA can be removed by steam peeling in an embodiment where it is essentially free of heat expandable fillers and other components that thermally lower the peel strength. With respect to these various additives, those heretofore known can be used according to typical methods. Since these do not particularly characterize the present invention, details are omitted.

In the art disclosed herein, the amounts of non-base-polymer components (other components besides the base polymer) in the PSA (favorably an acrylic polymer) may be limited. In the art disclosed herein, the amounts of non-base-polymer components in the PSA is, for instance, about 30% by weight or less, suitably about 15% by weight or less, or preferably about 12% by weight or less (e.g., about 10% by weight or less). The PSA having such a composition is likely to satisfy certain optical properties (e.g., transparency) and can be preferably used for optical applications. In some embodiments, the amounts of non-base-polymer components in the PSA can be about 5% by weight or less, about 3% by weight or less, or even about 1.5% by weight or less (e.g., about 1% by weight or less). The composition having such limited amounts of other components besides the base polymer (e.g., an acrylic polymer) can be preferably employed for the photocurable PSA composition.

(Formation of PSA Layer)

When the PSA has a PSA layer form, the PSA layer may be a cured layer of the PSA composition. In other words, the PSA layer can be formed by providing (e.g., applying) the PSA composition to a suitable surface and then subjecting it to a suitable curing process. When two or more different curing processes (drying, crosslinking, polymerization, etc.) are carried out, these can be done at the same time or in stages. When a partial polymer (acrylic polymer syrup) of the monomers is used for the PSA composition, a final copolymerization reaction is typically carried out as the curing process. That is, the partial polymer is subjected to a further copolymerization reaction to form a fully polymerized product. For instance, when drying is necessary with a photocurable PSA composition (e.g., in case of a photocurable PSA composition in a form of partial polymer of monomers dissolved in an organic solvent), photoirradiation can be carried out after the composition is allowed to dry. With respect to a PSA composition using a fully polymerized product, as the curing process, processes such as drying (drying with heat) and crosslinking are typically carried out as necessary. The PSA layer having a multilayer structure with two or more layers can be prepared by adhering pre-formed PSA layers together. Alternatively, a PSA composition can be applied onto a pre-formed first PSA layer and allowed to cure to form a second PSA layer.

The PSA composition can be applied with, for example, a conventional coater such as a gravure roll coater, a reverse roll coater, a kiss-roll coater, a dip roll coater, a bar coater, a knife coater and a spray coater.

(Thickness of PSA Layer)

The thickness of the PSA layer is not particularly limited. It can be, for instance, about 3 µm to 2000 µm. From the standpoint of the conformability to contours and the tightness of adhesion to adherend, in some embodiments, the thickness of the PSA layer is, for instance, suitably 10 µm or greater, preferably 50 µm or greater, possibly 70 µm or greater, 100 µm or greater, or even 150 µm or greater. A PSA large in thickness has high adhesive strength which is likely to increase with time, often leading to difficulties in removal. With respect to such a PSA layer, it is effective to apply the method disclosed herein. From the standpoint of preventing the occurrence of leftover adhesive residue due to cohesive failure of the PSA layer, in some embodiments, the thickness of the PSA layer can be, for instance, 1000 µm or less, 500 µm or less, 300 µm or less, or even 200 µm or less.

(Haze Value)

The PSA is preferably an optical PSA (PSA for optical applications). The optical PSA may not impair optical properties. The haze value of the PSA (layer) or even of the PSA sheet is not particularly limited. In some embodiments, the haze value is suitably about 10% or lower, or possibly about 5% or lower (e.g., about 3% or lower). The haze value is preferably 1.0% or lower. Such a highly transparent PSA is suitable for optical applications requiring high optical transparency. The haze value can be below 1.0%, below 0.7%, or even 0.5% or lower (e.g., 0 to 0.5%). The haze value can be adjusted through selections of a composition, thickness, etc., of the PSA.

Here, the "haze value" refers to the ratio of diffused light transmittance to total light transmittance when the analytical sample is irradiated with visible light. It is also called the cloudiness value. The haze value can be expressed by the equation below.

$$Th\ (\%) = Td/Tt \times 100$$

In the equation, Th is the haze value (%), Td is the diffused light transmittance, and Tt is the total light transmittance. The haze value can be determined using a haze meter (e.g., product name MR-100 available from Murakami Color Research Laboratory Co., Ltd.) after the adhesive face of the PSA layer or PSA sheet is applied to one face of alkaline glass with 0.1% haze to form a laminate of the PSA layer or PSA sheet and the alkaline glass. For the measurement, the alkaline glass bearing the PSA layer or PSA sheet is arranged so that the PSA layer or PSA sheet is on the light source side. As the haze value of the alkaline glass is 0.1%, 0.1% is subtracted from the measurement value to determine the haze value (%) of the PSA layer or PSA layer.

(Substrate Layer)

In some embodiments, the PSA sheet used for member joining in the joined object has a substrate layer. The substrate layer is a support object (support layer) supporting a PSA layer. The substrate layer can be a middle layer placed between the first and second PSA layers forming the PSA sheet surface.

Examples of the substrate layer disclosed herein include various resin films such as polyolefin film, polyester film and polyvinyl chloride film; foam sheets formed of foams such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foils such as aluminum foil, copper foil and stainless steel (SUS). The support object may be a layer-like object formed of a composite of these. Examples of the substrate layer having such a composite structure include a laminate substrate (multilayer substrate) having a layered structure of metal foil and resin film, and a resin sheet reinforced with inorganic fibers such as glass cloth.

As the material of the substrate layer, it is preferable to use a material comprising a resin film capable of independently holding its shape (standing by itself or independently) as the base film. The "resin film" here means a resin film having a non-porous structure and is typically substantially free of air bubbles (void-less). Thus, the concept of resin film is distinct from foam films and non-woven fabrics. The resin film may have a monolayer structure or a multilayer structure with two or more layers (e.g., a three-layer structure). The resin film can be transparent. Transparent resin film is suitable for optical applications.

Favorable examples of the resin material forming the resin film include polyester-based resins, polyphenylene sulfide (PPS) resins, polyolefin-based resins and polyimide resins. Specific examples of resin film that can be preferably used as the substrate layer include polyethylene terephthalate (PET) film, polyethylene naphthalate (PEN) film, PPS film, polyether ether ketone (PEEK) film, transparent polyimide (CPI) film, polypropylene (PP) film, and triacetyl cellulose (TAC) film. Preferable examples in terms of strength include PET film, PEN film, PPS film, PEEK film and CPI film. From the standpoint of the availability, size stability, optical properties, etc., preferable examples include PET film, CPI film and TAC film.

The resin film may include, as necessary, known additives such as photo stabilizer, antioxidant, antistatic agent, colorant (dye, pigment, etc.), fillers, slip agent and anti-blocking agent. The amount of an additive is not particularly limited and can be suitably selected according to the application, etc.

The method for producing the resin film is not particularly limited. For instance, heretofore known general resin film formation methods can be suitably employed, such as extrusion molding, inflation molding, T-die casting and calendar rolling.

The substrate layer may be substantially formed from such resin film. Alternatively, the substrate layer may include an auxiliary layer in addition to the resin film. Examples of the auxiliary layer include surface-treated layers such as a primer layer and a release layer. The surface of the substrate layer on the PSA layer side may be subjected as necessary to a heretofore known surface treatment such as corona discharge treatment, plasma treatment, UV irradiation, acid treatment, alkali treatment, primer coating, antistatic treatment and release treatment.

The thickness of the substrate layer is not particularly limited. For instance, it can be about 1000 µm or less, or even about 500 µm or less. From the standpoint of reducing the weight and thickness, it is suitably about 100 µm or less, or possibly even 70 µm or less. From the standpoint of the ease of handling, processing, etc., the substrate layer has a thickness of, for instance, possibly 1 µm or greater, suitably about 20 µm or greater, or preferably about 30 µm or greater.

EXAMPLES

Several working examples related to the present invention are described below, but these specific examples are not to limit the present invention. In the description below, "parts" and "%" are by weight unless otherwise specified.
<Preparation of PSA Sheets>

Preparation Example A

Into a 4-necked flask, were placed 100 parts of a monomer mixture containing n-butyl acrylate/cyclohexyl acrylate/4-hydroxybutyl acrylate/hydroxyethyl acrylate at a weight ratio of 57/12/23/8 along with 0.1 part of product name IRGACURE 651 (available from Ciba Specialty Chemicals, Inc.) and 0.1 part of product name IRGACURE 184 (available from Ciba Specialty Chemicals, Inc.) as photopolymerization initiators. Under a nitrogen atmosphere, the reaction mixture was subjected to UV irradiation to carry out photopolymerization to a viscosity of about 15 Pas (BH viscometer, No. 5 rotor, 10 ion, measurement temperature 30° C.) to prepare a monomer syrup containing a partial polymer of the monomer mixture. To 100 parts of the monomer syrup, were added and evenly mixed 0.1 part of dipentaerythritol hexaacrylate as a polyfunctional monomer, 0.3 part of a nonionic surfactant (polyoxyethylene sorbitan monolaurate, HLB 16.7, product name RHEODOL TW-L120 available from Kao Corporation) as a hydrophilicity enhancer and 0.4 part of product name KBE403 (available from Shin-Etsu Silicone) as a silane coupling agent to prepare a UV-curable PSA composition.

To a 38 µm thick release film R1 (MRF #38, Mitsubishi Plastics, Inc.) having a release face on one side of polyester film, the resulting PSA composition was applied and covered with a 38 µm thick release film R2 (MRE #38, Mitsubishi Plastics, Inc.) having a release face on one side of polyester film to block air. The resultant was allowed to cure by UV irradiation to form a 200 µm thick PSA layer. The UV irradiation was performed using a black light lamp, at an intensity of 4 mW/cm$^2$ (measured with an industrial UV checker (trade name UVR-T1 available from Topcon Corporation) with peak sensitivity at ~350 nm wavelength) for 180 seconds. In this manner, was obtained PSA sheet A (consisting of a PSA layer). The faces of PSA sheet A applied to adherends are protected with release films R1 and R2.

Preparation Example B

No hydrophilicity enhancer was used. Otherwise in the same manner as Preparation Example A, was obtained PSA Sheet B.
<Determination of Post-Acceleration-Test Peel Strength>
[Normal Peel Strength]

By the method described below, PSA sheets A and B were measured for post-acceleration-test normal peel strength. From each PSA sheet, was removed the release liner covering one face of the PSA layer (a supportless double-faced PSA sheet). To the exposed adhesive face, was adhered 50 µm thick polyethylene terephthalate (PET) film (LUMIRROR S10 available from Toray Industries, Inc.) for backing. The resultant was cut to a 20 mm wide 200 mm long size to prepare a test piece.

In an environment at 23° C. and 50% RH, from the test piece, was removed the release liner covering the other face of the PSA layer. The exposed adhesive face was press-bonded to an alkaline glass plate (65 mm×165 mm size) as an adherend with a 2 kg rubber roller moved back and forth twice. This was stored at 60° C. for 4 days (acceleration test corresponding to 25° C. for 200 days by Arrhenius model). Subsequently, in an environment at 23° C. and 50% RH, to a short side end of the test piece, was fixed a force gauge (SATOTECH® DIGITAL FORCE GAUGE FG-5100). While holding the force gauge by hand, manual peeling was carried out at a peel angle of 90° to 150° at a peeling speed of 10 mm/min to 100 mm/min to determine the post-acceleration-test normal peel strength (N/20 mm). It is noted that the normal peel strength measurement was carried out until advancing to the water-peel strength measurement described below, that is, until distilled water was supplied to the peeling interface. As the adherend, was used an alkaline glass plate (available from Matsunami Glass Ind., Ltd.; fabricated by the float method, 1.35 mm thick, blue slide glass with polished edges, 8° contact angle with distilled water on the surface adhered to the PSA sheet). The results are shown in Table 1.

[Water-Peel Strength]

In the normal peel strength measurement, while measuring the normal peel strength of the test piece on the adherend, 20 jut of distilled water was supplied where the test piece started to separate from the adherend (i.e., to the peel front line) and the peel strength after the distilled water supply (i.e., the water-peel strength) (N/20 mm) was measured. The results are shown in Table 1.

As for the water-peel strength measurement, the normal peel strength and water-peel strength measurements can be carried out serially; or they can be carried out on different test pieces. For instance, when it is difficult to obtain a test piece having a sufficient length for carrying out serial measurements, etc., the embodiment of carrying out measurements on different test pieces can be employed. The adherend, acceleration test, tensile tester and other matters are basically the same as the measurement of normal peel strength.

[In-Hot-Water Peel Strength]

With respect to PSA sheets A and B, in the same manner as the normal peel strength measurement, test pieces (PET film/PSA sheet) were prepared; each resulting test piece was press-bonded to an alkaline glass plate (the same kind as for the normal peel strength measurement); and the acceleration test was carried out. Subsequently, the test piece was immersed in hot water at 60° C. for 10 minutes. While immersed in hot water, to a short side end of the test piece, was fixed a force gauge (SATOTECH® DIGITAL FORCE GAUGE FG-5100). In this state (immersed in hot water), while holding the force gauge by hand, manual peeling was carried out at a peel angle of 90° to 150° at a peeling speed of 10 mm/min to 100 mm/min to determine the post-acceleration-test in-hot-water peel strength (N/20 mm). The results are shown in Table 1.

[Steam-Peel Strength]

With respect to PSA sheets A and B, in the same manner as the normal peel strength measurement, test pieces (PET film/PSA sheet) were prepared; each resulting test piece was press-bonded to an alkaline glass plate (the same kind as for the normal peel strength measurement); and the acceleration test was carried out. Subsequently, to a short side end of the test piece, was fixed a force gauge (SATOTECH® DIGITAL FORCE GAUGE FG-5100). While holding the force gauge by hand, manual peeling was carried out at a peel angle of 90° to 150° at a peeling speed of 10 mm/min to 100 mm/min. The manual peeling was carried out while spraying steam at the interface between the PSA layer and the alkaline glass plate. The peel strength (steam-peel strength) (N/20 mm) during the manual peeling was measured. Steam was sprayed using a steam sprayer (product name STM-304N available from Iris Ohyama Inc.), at 3 atm, at a discharge temperature of 100° C. (catalog value), at a temperature of 70° C. to 80° C. at 1 cm of distance from the nozzle orifice. The results are shown in Table 1.

In the measurements of post-acceleration-test adhesive strength, as the adherend, it is possible to use an alkaline glass plate fabricated by the float method with a surface (to which the test piece is adhered) having a contact angle of 5° to 10° with distilled water. As such an adherend, it is possible to use an alkaline glass plate available from Matsunami Glass Ind., Ltd. Not limited to this, it is also possible to use a comparable product to the alkaline glass plate available from Matsunami Glass Ind., Ltd., or other alkaline glass plates.

The contact angle of the alkaline glass plate is determined by the following method. In an environment at 23° C. and 50% RH (measurement atmosphere), measurement is carried by a drop method, using a contact angle meter (available from Kyowa Interface Science Co., Ltd.; product name DMo-501, control box DMC-2, control/analysis software FAMAS (version 5.0.30)). The amount of distilled water dropped is 2 µL. From an image taken at 5 seconds after distilled water is dropped, the contact angle is determined by the Θ/2 method (conducted 5 times).

<Evaluation of Post-Acceleration-Test Peeling Properties>

[Normal Peeling]

By the method described below, PSA sheets A and B were evaluated for post-acceleration-test normal peel strength. From each PSA sheet, was removed the release liner covering one face of the PSA layer (a supportless double-faced PSA sheet). To the exposed adhesive face, was adhered 11 µm thick aluminum foil (product name SUN FOIL available from Toyo Aluminium Ekco Products Co., Ltd.). The resultant was cut to an 80 mm×200 mm size. Subsequently, was removed the release liner covering the other face of the PSA layer. The exposed adhesive face was adhered to the entire surface (65 mm×165 mm size) of an alkaline glass plate (available from Matsunami Glass Ind., Ltd.; fabricated by the float method, 1.35 mm thick, blue slide glass with polished edges, 8° contact angle with distilled water on the surface adhered to the PSA sheet). The layered structure of aluminum foil/PSA/alkaline glass plate was press-bonded with a rubber roller moved back and forth twice. Any portions of the aluminum foil and PSA extending off the alkaline glass plate were removed by cutting to prepare an aluminum foil/PSA/alkaline glass plate laminate subject to evaluation. The aluminum foil/PSA/alkaline glass plate laminate was stored at 60° C. for four days (acceleration test corresponding to 25° C. for 200 days by Arrhenius model). Then, in an environment at 23° C. and 50% RH, a peeling start point was formed at an edge with a cutter or plastic spatula; and while carefully avoiding tearing and breaking, the aluminum foil/PSA laminate was manually peeled off the alkaline glass plate at a speed that allowed removal within 3 minutes. The results are shown in Table 1.

[Water Peeling]

With respect to PSA sheets A and B, in the same manner as the evaluation of normal peeling properties, was prepared an aluminum foil/PSA/alkaline glass plate laminate subject to evaluation, and subjected to the acceleration test (stored at 60° C. for 4 days). Then, in an environment at 23° C. and 50% RH, a peeling start point was formed at an edge with a cutter or plastic spatula, and 20 µL of distilled water was supplied where the PSA started to separate from the alkaline glass plate (i.e., to the peel front line). While carefully avoiding tearing and breaking, the aluminum foil/PSA laminate was manually peeled off the alkaline glass plate at a speed that allowed removal within 3 minutes. The results are shown in Table 1.

[In-Hot-Water Peeling]

With respect to PSA sheets A and B, in the same manner as the evaluation of normal peeling properties, was prepared an aluminum foil/PSA/alkaline glass plate laminate for evaluation, and subjected to the acceleration test (stored at 60° C. for 4 days). The test piece (laminate) was then immersed in hot water at 60° C. for 10 minutes. In the state immersed in hot water, a peeling start point was formed at an edge with a cutter or plastic spatula; and while carefully avoiding tearing and breaking, the aluminum foil/PSA laminate was manually peeled off the alkaline glass plate at a speed that allowed removal within 3 minutes. The results are shown in Table 1.

[Steam Peeling]

With respect to PSA sheets A and B, in the same manner as the evaluation of normal peeling properties, was prepared an aluminum foil/PSA/alkaline glass plate laminate for evaluation, and subjected to the acceleration test (stored at 60° C. for 4 days). Subsequently, a peeling start point was formed at an edge with a cutter or plastic spatula; and while supplying steam to the interface between the PSA and alkaline glass plate, with careful attention to avoid tearing and breaking, the aluminum foil/PSA laminate was manually peeled off the alkaline glass plate at a speed that allowed removal within 3 minutes. Steam was sprayed using a steam sprayer (product name STM-304N available from Iris Ohyama Inc.), at 3 atm, at a discharge temperature of 100° C. (catalog value), at a temperature of 70° C. to 80° C. at 1 cm of distance from the nozzle orifice. The results are shown in Table 1.

illustrations and do not limit the scope of claims. The art according to the claims includes various modifications and changes made to the specific embodiments illustrated above.

REFERENCE SIGNS LIST

1 PSA (PSA sheet)
1A first surface (first adhesive face)
1B second surface (second adhesive face)
100 joined object
120 first member
140 second member
140A surface (PSA side surface) of second member
200 steam
250 steam atomizer
260 nozzle (discharge nozzle)

TABLE 1

| | PSA Hydro-philicity enhancer | Measurement of post-acceleration-test peel strength (N/20 mm) | | | | Post-acceleration-test peeling properties | | | |
|---|---|---|---|---|---|---|---|---|---|
| | | Normal peel strength | Water-peel strength | In-hot-water peel strength | Steam-peel strength | Normal peel strength | Water-peel strength | In-hot-water peel strength | Steam-peel strength |
| PSA sheet A | present | 28-30 | 28-30 | 12-16 | 8-9 | non-peelable | non-peelable | non-peelable | peelable |
| PSA sheet B | absent | 28-30 | 28-30 | 15-20 | 15-20 | non-peelable | non-peelable | non-peelable | non-peelable |

As shown in Table 1, both PSA sheets A and B have post-acceleration-test normal peel strength and water-peel strength values as high as 28 N/20 mm to 30 N/20 mm, and with respect to PSA sheets A and B, in the evaluation of post-acceleration-test peeling properties, the aluminum foil was torn while being peeled, failing to achieve smooth removal of the PSA without damage to the adherend. These results indicate that, as a result of the acceleration test, originally water-peelable PSA sheet A lost the water-peeling properties and became comparable in water-peeling properties to PSA sheet B that originally lacked water-peeling properties. With respect to the in-hot-water peel strength, in PSA sheet A having the hydrophilicity enhancer-containing PSA, there was a tendency towards a decrease in in-hot-water peel strength than in PSA sheet B not using a hydrophilicity enhancer. However, in the evaluation of in-hot-water peeling properties, similar to the normal peeling and water-peeling, the aluminum foil was torn during removal and the PSA was not smoothly peeled off.

On the other hand, with respect to steam peeling, a significant difference was found between PSA sheets A and B. In particular, the steam-peel strength of PSA sheet A having the hydrophilicity enhancer-containing PSA decreased by half when compared with PSA sheet B not using a hydrophilicity enhancer. In the evaluation of post-acceleration-test steam-peeling properties, with PSA sheet B, similar to the normal peeling, water-peeling and in-hot-water peeling, the aluminum foil was torn during removal and smooth PSA removal was not achieved; however, with PSA sheet A, the PSA was removed by steam peeling and the laminate was separated.

The above results indicate that, in separating a joined object for display device with the object including two members joined with a hydrophilicity enhancer-containing PSA, by supplying steam towards the PSA, the PSA can be peeled off the member and the two members can be separated.

Although specific embodiments of the present invention have been described in detail above, these are merely for

The invention claimed is:

1. A method for separating a joined object for display device, wherein
   the joined object comprises two members of the display device which are joined with a pressure-sensitive adhesive comprising a hydrophilicity enhancer, the hydrophilicity enhancer being liquid at 25° C.,
   the method comprises a step of peeling the pressure-sensitive adhesive from at least one of the two members by supplying steam towards the pressure-sensitive adhesive,
   the steam is supplied by spraying, and
   the steam has a temperature of 70° C. or higher and below 100° C. at a distance of 1 cm from a nozzle orifice discharging the steam.

2. The method according to claim 1, wherein at least one of the two members is a glass member.

3. The method according to claim 1, wherein one of the two members is a glass member and the other is a display member having a thickness of 2 mm or less.

4. The method according to claim 1, wherein the pressure-sensitive adhesive contains the hydrophilicity enhancer in an amount of 0.05 part to 3.00 parts by weight to 100 parts by weight of a polymer in the pressure-sensitive adhesive.

5. The method according to claim 1, wherein the pressure-sensitive adhesive is a pressure-sensitive adhesive layer having a thickness of 100 μm or greater.

6. The method according to claim 5, wherein the pressure-sensitive adhesive layer has a haze value of 10% or lower.

7. The method according to claim 1, the method comprising
   before supplying the steam towards the pressure-sensitive adhesive, a step of judging if the pressure-sensitive adhesive can be water-peeled from at least one of the two members, wherein
   the water-peeling is carried out while an aqueous liquid is present where the pressure-sensitive adhesive is being peeled off a surface of the at least one of the two members, and after an absence of possibility for the water-peeling is confirmed, the steam is supplied towards the pressure-sensitive adhesive.

8. The method according to claim 1, wherein the display device is a liquid crystal display device or an organic electroluminescence display device.

9. The method according to claim 1, the method comprising before supplying the steam towards the pressure-sensitive adhesive, a step of judging if the pressure-sensitive adhesive can be water-peeled from at least one of the two members, wherein the judging being carried out by entirely immersing the joined object in hot water at 60° C. and determining an in-hot-water peel strength with a force gauge fixed to an end of the joined object by holding the force gauge by hand and manually peeling at a peel angle of 90° to 150° at a peeling speed of 10 mm/min to 100 mm/min, and after an absence of possibility for water-peeling is confirmed, the steam is supplied towards the pressure-sensitive adhesive.

10. The method according to claim 1, wherein the pressure-sensitive adhesive is a pressure-sensitive adhesive layer having a thickness of 150 μm or greater.

11. The method according to claim 1, wherein a discharge pressure of the steam from the nozzle is 1.5 atm or more and 5 atm or less.

12. A method for separating a joined object for display device, wherein the joined object comprises two members joined with a pressure-sensitive adhesive comprising a hydrophilicity enhancer, the hydrophilicity enhancer being liquid at 25° C., and the method comprises a step of peeling the pressure-sensitive adhesive from at least one of the two members by supplying steam towards the pressure-sensitive adhesive, the pressure-sensitive adhesive is, before supplying the steam towards the pressure-sensitive adhesive, bonded to at least one of the two members with an adhesive strength corresponding to an in-hot-water peel strength of 10 N/20 mm or greater, the in-hot-water peel strength being determined with a force gauge fixed to an end of the joined object, containing the pressure-sensitive adhesive, entirely immersed in hot water at 60° C., by holding the force gauge by hand and manually peeling at a peel angle of 90° to 150° at a peeling speed of 10 mm/min to 100 mm/min.

* * * * *